United States Patent [19]

Knasel

[11] Patent Number: 5,463,943
[45] Date of Patent: Nov. 7, 1995

[54] FRUIT CUTTING AND CORING APPARATUS

[75] Inventor: Susan M. Knasel, Kirkwood, Mo.

[73] Assignee: Super Market Merchandising, St. Louis, Mo.

[21] Appl. No.: 219,676

[22] Filed: Mar. 29, 1994

Related U.S. Application Data

[63] Continuation-in-part of Ser. No. 40,522, May 27, 1993, Pat. No. 5,373,781.

[51] Int. Cl.$^6$ .................................................. A23N 4/20
[52] U.S. Cl. ....................................... 99/542; 99/544
[58] Field of Search ................................. 30/113.1–113.3; 83/588, 613, 621, 932; 99/542, 543, 544, 545; 100/213

[56] References Cited

U.S. PATENT DOCUMENTS

| | | | |
|---|---|---|---|
| 53,063 | 3/1866 | Van Kersen | 99/545 |
| 83,494 | 10/1868 | Hassam . | |
| 86,045 | 1/1869 | Vaughn | 99/545 |
| 195,750 | 10/1877 | East | 99/545 |
| 2,509,190 | 5/1950 | Langley . | |
| 2,625,972 | 1/1953 | Torres . | |
| 2,664,129 | 12/1953 | Coons . | |
| 3,128,810 | 4/1964 | Whipp . | |
| 3,203,343 | 8/1965 | Myers . | |
| 3,696,847 | 10/1972 | Erekson et al. . | |
| 4,546,545 | 10/1985 | Hirano . | |
| 5,067,397 | 11/1991 | Healy . | |
| 5,142,973 | 9/1992 | Tur et al. . | |
| 5,337,480 | 8/1994 | Codikow | 99/545 |
| 5,373,781 | 12/1994 | Knasel | 99/542 |

FOREIGN PATENT DOCUMENTS

| | | |
|---|---|---|
| 817351 | 10/1951 | Germany . |
| 67866 | 5/1914 | Switzerland . |

*Primary Examiner*—David Scherbel
*Assistant Examiner*—Terrence R. Till
*Attorney, Agent, or Firm*—Polster, Lieder, Woodruff & Lucchesi

[57] ABSTRACT

An apparatus (110) is provided for cutting the skin (S) of a piece of fruit (F) so it can be peeled off, and making a core cut (C) through the middle of the fruit. A base plate (112) has an upper surface for supporting a piece of fruit in a position in which it can be cut and cored. An inner cutting blade (120) and an outer cutting blade (122) are movable from a first position above the piece of the fruit toward the cutting board. These blades are coaxially aligned with each other. The outer blade is a circular blade which cuts through the skin of the fruit so it can be peeled off. Peel cutting blades (162) extend outwardly from the outer blade to slice the peel so that it may be removed. The peel cutting blades and outer blade are removably secured to apparatus for simple changing of the blades. A handle mechanism is used to simultaneously move the blades.

11 Claims, 3 Drawing Sheets

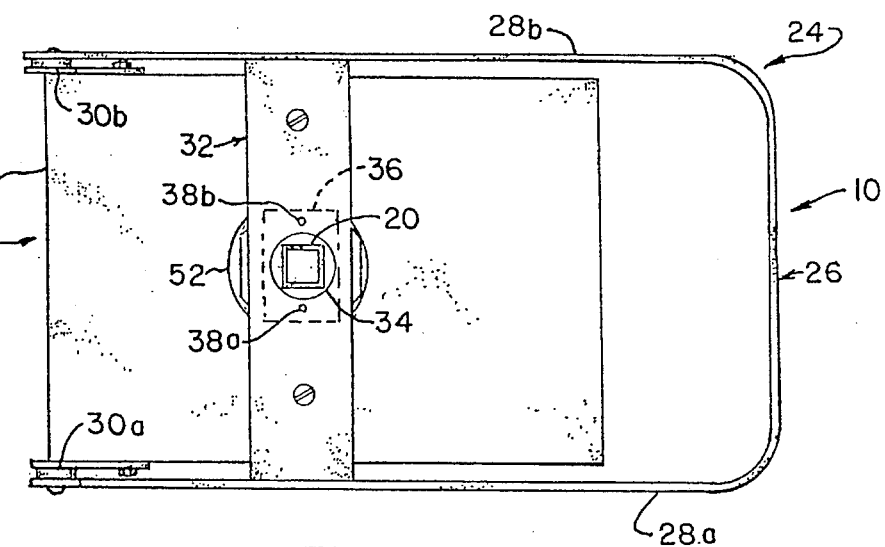
FIG.8A
FIG.8B
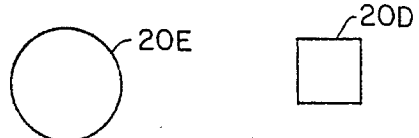
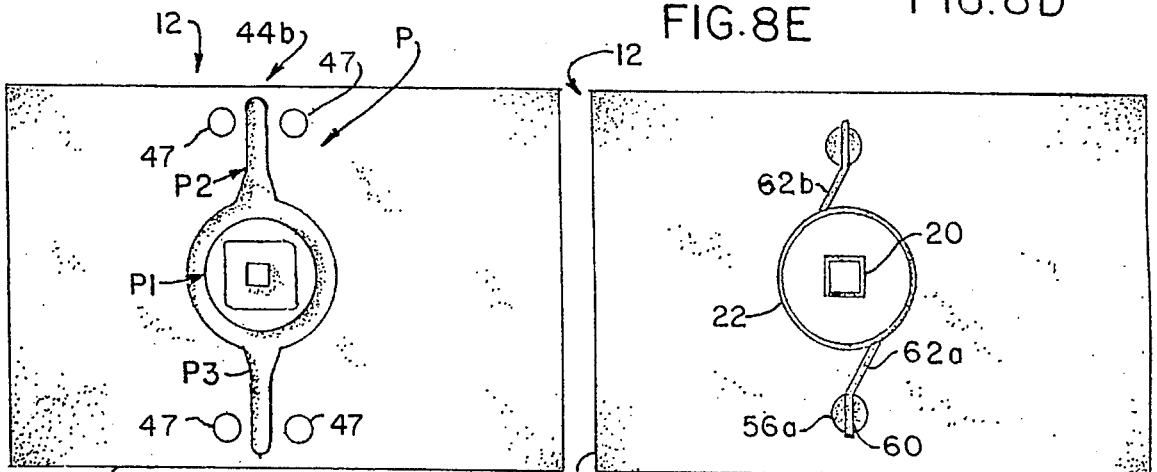
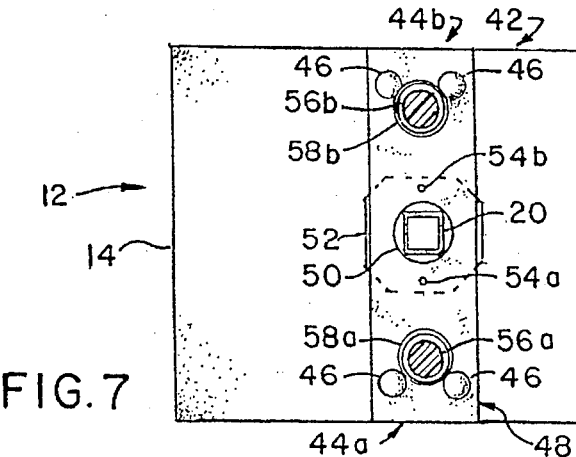
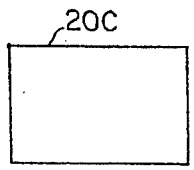
FIG.8C

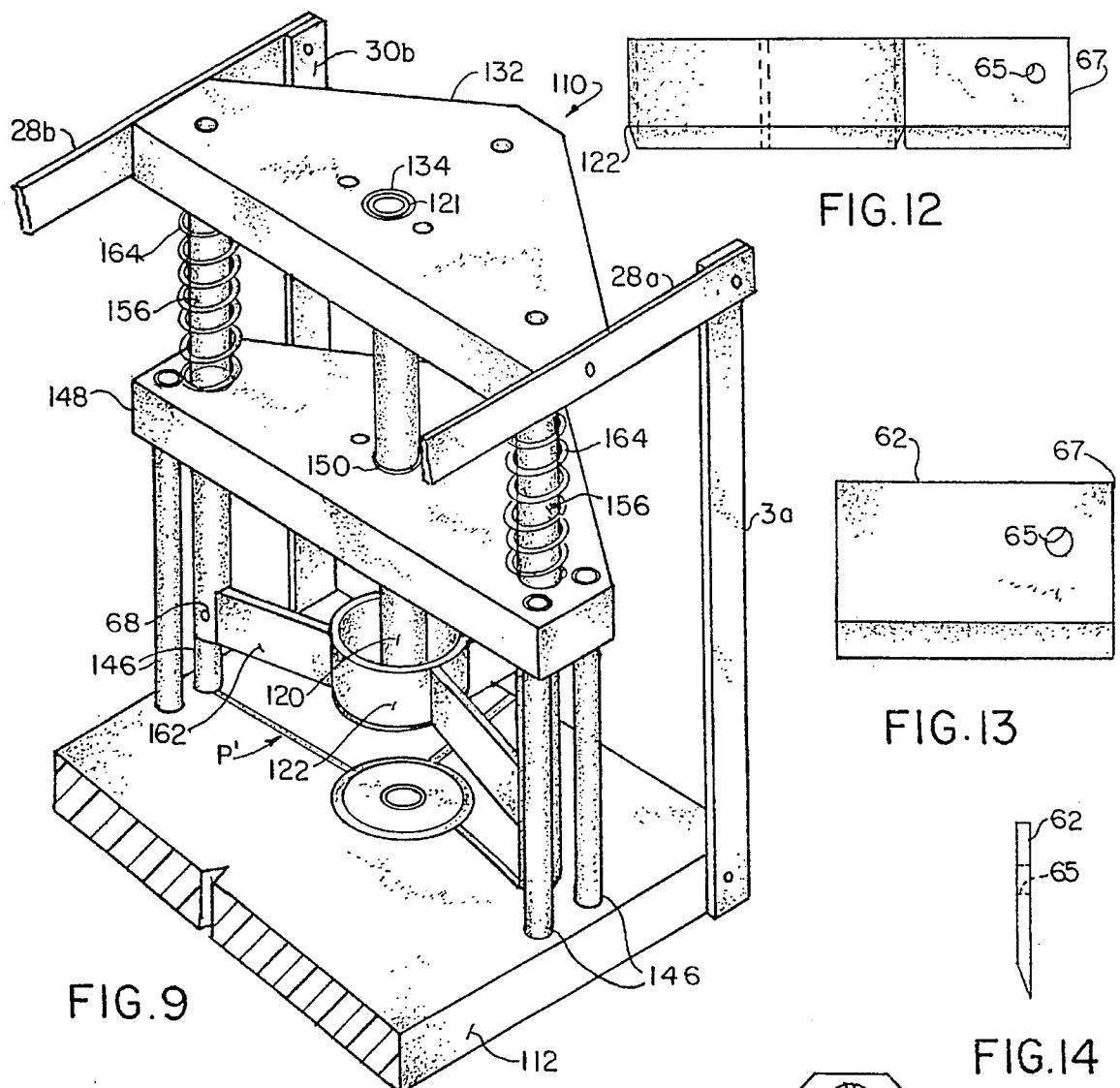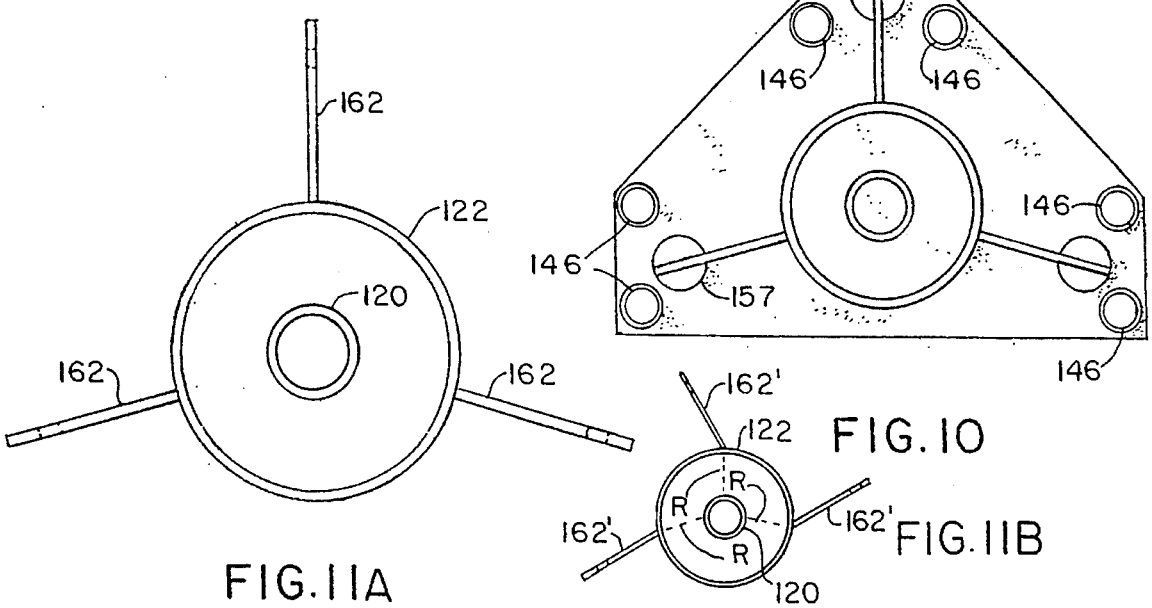

FRUIT CUTTING AND CORING APPARATUS

CONTINUING APPLICATION DATA

This application is a continuation-in-part application of application Ser. No. 08/040,522, filed Mar. 27, 1993, which is incorporated herein by reference now U.S. Pat. No. 5,373,781.

BACKGROUND OF THE INVENTION

This invention relates to supermarket appliances and more particularly to apparatus for cutting the skin of a piece of fruit so it can be peeled, and at the same time coring the fruit.

A coring appliance is often used for preparing fruit for displays in supermarkets, or for making fruit baskets or the like. Such an appliance is useful, for example, with fruits such as pineapples. One appliance of this type is disclosed in U.S. Pat. No. 5,067,397 to Healy. It has been found that for display purposes, a square or rectangular core of fruit is often more appealing to the eye than a circular shaped core. Accordingly, if an appliance making a circular core is used, the fruit must be further trimmed to provide a rectangular shape. This is both time consuming and costly. At the same time, it has also been found that the way in which the skin of the fruit is cut, to facilitate peeling the fruit, can also be improved. It has also been found that when the appliance has three or more peel cutting blades, the appliance is easier to operate to core and peel a piece of fruit.

SUMMARY OF THE INVENTION

Among the several objects of the present invention may be noted the provision of apparatus for simultaneously cutting the skin and coring a piece of fruit such as a pineapple, grapefruit, or melon.

Another object is the provision of such an apparatus which will cut the skin at an angle other than perpendicular to facilitate peeling the fruit.

Another object is the provision of such an apparatus which is easy to use and relatively low in cost.

Another object is the provision of such an apparatus to provide other non-circular shaped cores of fruit.

Another object is the provision of such an apparatus which is easily movable and readily stored when not in use.

Another object is the provision of such an apparatus in which its peel cutting blades are readily removable for cleaning, sharpening, or replacing.

These and other objects will be in part apparent and in part pointed out hereinafter.

Briefly, the apparatus of the present invention is for coring and peeling a fruit. The apparatus includes a base plate having an upper surface on which a piece of fruit is placed. This upper surface acts as a cutting board. An inner cutting blade cuts through the fruit to separate the fruit's core from its flesh or pulp. An outer cutting blade is circular in shape to separate the fruit's skin from its flesh. Peel cutting blades cut the skin of the fruit to facilitate removal of the skin from the fruit. At least two peel cutting blades are provided. Preferably three blades are provided which are evenly spaced around the outer cutting blade. The outer blade and peel cutting blades are preferably formed as a single assembly which is removably secured to the corer. A manually operable handle is used to simultaneously move both blades from a first position above the cutting board toward the cutting board so the respective core cuts and skin cuts are made.

BRIEF DESCRIPTION OF THE DRAWINGS

FIGS. 2–4 are respective front, side, and top views of the apparatus;

FIGS. 5–7 are respective sectional views taken along lines 5—5, 6—6, and 7—7 in FIG. 2;

FIGS. 8A–8E are representative cross-sections of alternate inner cutting blades of the apparatus.

FIG. 9 is a perspective view of a second embodiment of the apparatus;

FIG. 10 is a bottom plan view of a stationary bar of the apparatus of FIG. 9;

FIG. 11A and 11B are respective plan views of two embodiments of the outer blade and skin cutting blades of the apparatus of FIG. 9;

FIG. 12 is a side elevational view of the outer blade assembly;

FIG. 13 is a front elevational view of a peel cutting blade of the apparatus; and FIG. 14 is a side elevational view of the peel cutting blade.

Corresponding reference characters indicate corresponding parts throughout the drawings.

DESCRIPTION OF A PREFERRED EMBODIMENT

Figure 2:
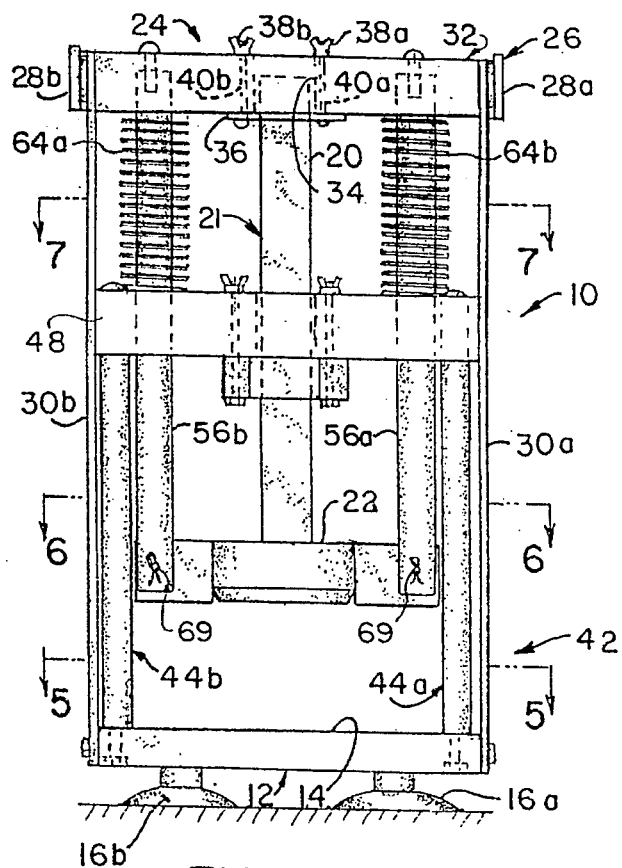

Referring to the drawings, a fruit cutting and coring apparatus of the present invention is indicated generally at 10 in FIG. 2. The apparatus is used, for example, to simultaneously cut a rectangular shaped core C (FIG. 1) in a piece of fruit F, and to cut through the skin S of the fruit as indicated at K1 and K2. While apparatus 10 is useful with fruit such as pineapples, other fruit such as melons and grapefruits can also be cored and skinned using the apparatus.

Apparatus 10 includes a base plate 12 which has an upper surface 14 forming a cutting board. As shown in FIG. 5, surface 14 may have inscribed therein a pattern P conforming to an outline for the fruit and for a cutting pattern provided by the apparatus. The pattern inscribed in surface 14 may include a center section P1 on which the piece of fruit is set to orient it relative to the cutting portion of the apparatus. It may also include outwardly extending inscribed arms P2 and P3 into which cutting blades described hereinafter fit when a cut is made. The inscribed pattern P is preferably formed as grooves.

To support base 12, respective suction cups 16a, 16b are attached to one end of the underside of the cutting board. Posts 18 are attached to the underside of the cutting board at the other end. Use of the suction cups allows the apparatus to be firmly set in place on a table top (not shown) or other compatible support surface. It will be understood that suction cups 16 could be used at each end of plate 12, if desired.

Next, the apparatus includes an inner cutting blade 20 and an outer cutting blade 22. Blade 20 is rectangular in cross-section so to make a generally rectangular shaped core cut and is formed at a bottom end of a tube 21. Blade 22 is a circular blade and is used to make a circular cut through skin S of the fruit to separate the fruit's skin from its flesh to facilitate peeling the fruit. Blades 20 and 22 are coaxially oriented with blade 22 being positioned outside of blade 20.

Figure 3:
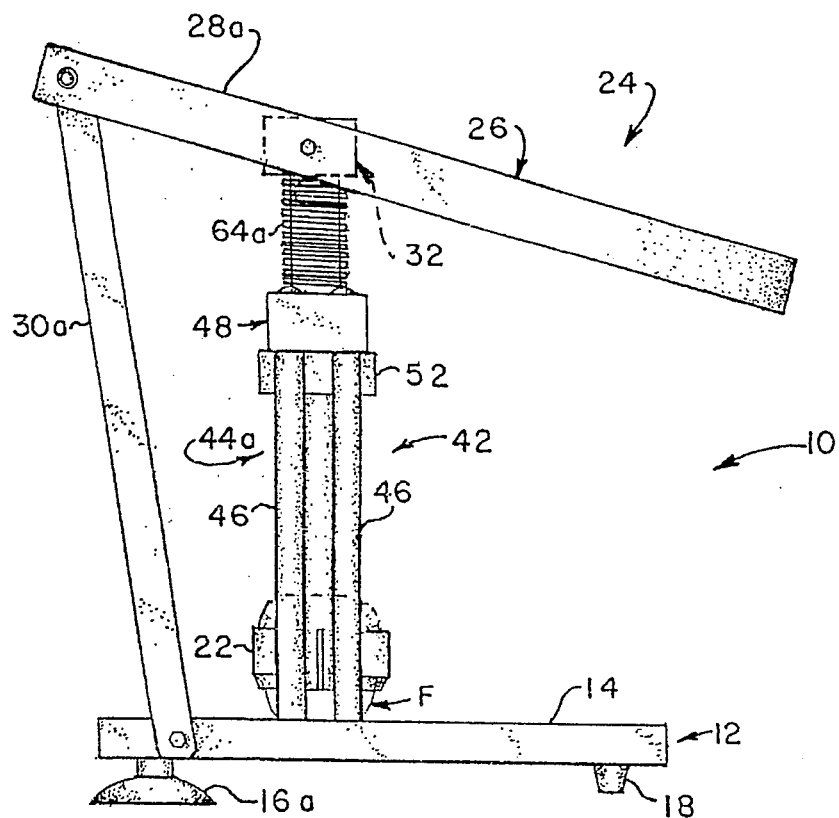

Both blades are simultaneously movable from a first position above the piece of fruit (see FIG. 1) to a lowered position (FIG. 3) in which a core cut and skin cuts are made in the piece of fruit.

A manually operable handle means 24 is used to raise and lower blades 20 and 22 simultaneously. Means 24 includes a U-shaped lever handle 26 having arms 28a, 28b. The outer ends of each arm are rotatably attached to vertical posts 30a, 30b. The lower ends of the posts are affixed to the sides of base 12.

A horizontal cross-member 32 extends between arms 28a, 28b at a point intermediate the length of the arms and is pivotally connected to the arms. Member 32 is therefore maintained in its horizontal position as it is raised and lowered by handle 24. Member 32 has a vertically extending circular opening 34 centered in the middle of the arm. The upper end of blade 20 fits into opening 34. Further, blade 20 has an integrally formed mounting plate 36 located sufficiently down the length of the blade shank so as to abut the underside of member 32 when the blade is mounted to the member. Plate 36 attaches to member 32, to attach blade 20 in place, by bolts 38a, 38b which fit through vertical bores 40a, 40b in member 32. The bores are located on opposite sides of opening 34.

Next, apparatus 10 includes a guide means 42 for guiding movement of the blades. Means 42 includes two pairs 44a, 44b of spaced apart poles 46 which extend vertically upward from base plate 12. Poles 46 are received in bores 47 formed in top surface 14 of base 12. An arm 48 is supported atop these posts, this arm being positioned directly beneath member 32. Arm 48 has a central opening 50 corresponding to opening 34 in member 32. Thus, blade 20 also extends through this opening to cut into the top of the piece of fruit. A guide block 52 is located on the underside of arm 48, and attaches to arm 48 by bolts 54a, 54b extending vertically through the arm. The opening 50 extends through block 52 to further guide movement of blade 20.

Figure 1:
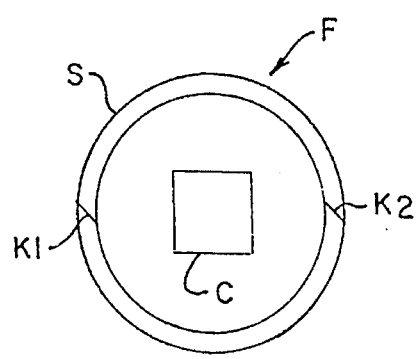
FIG. 1 is a cross-section of a piece of fruit illustrating the coring and skin cuts made by the apparatus of the present invention.

Rods 56a, 56b are mounted to the underside of member 32 and extend through respective openings 58a, 58b in arm 48. The lower ends of the rods have vertical slits 60a, 60b in which the outer ends of respective peel cutting blades 62a, 62b are carried. Blades 62a, 62b are integral with outer blade 22 to attach the outer blade to the posts for lowering and raising the outer blade. Blades 62a, 62b extend parallel to each other, but are not co-planar. Rather, the blades are set at an angle of between approximately 5° to 10° with respect to a diametric center-line extending through the outer blade between the rods. As seen in FIG. 1, blades 62a, 62b make the angled cuts K1, K2 through the skin of the fruit. Because the blades 62a, 62b are not coplanar, they cut through a larger cross-section of the fruit's skin than would a blade which extends perpendicularly from the blade 22 along its radius. This wider cut makes peeling of the fruit easier. Preferably, the pattern P conforms to the pattern formed by blades 20, 22, and 62.

The blades 62 have a hole 65 (FIG. 13) formed at an end 67 thereof remote from outer blade 22. The ends 67 of blades 62 are received in slots 60 of posts 56. Posts 56 have generally horizontal bores 68 (FIG. 9) therethrough with which blade hole 65 is aligned. A fastener 69 (FIG. 2), such as a cotter pin or screw with a bolt, is passed through the peel blades 62 and posts 56 to fix the outer blade 22 and peel blade 62 to the posts 56. The outer blade and peel cutting blade are therefore easily removed from the posts 56 and apparatus 10 for cleaning, sharpening, or replacing.

Respective springs 64a, 64b are mounted about rods 56a, 56b. The springs are mounted between member 32 and arm 48 and serve to bias member 32 upwardly so that the blades are normally in a raised position.

Referring to FIGS. 8A–8E, it will be seen that blade 20 may be replaced with other inner blades 20A–20E. These blades allow other decorative cores to be cut from a piece of fruit. Other shaped blades could also be used.

A second embodiment of the corer and peeler is shown in FIGS. 9–12. As seen in FIG. 9, corer 110 is generally similar to corer/peeler 10. However, rather than having two peel cutting blades 62 extending from blade 22, corer 110 has three peel cutting blades 162 extending from blade 122. The provision of three, rather than two, cutting blades has been found to greatly facilitate the peeling and coring of the fruit. Because the apparatus 110 cuts through three areas of skin, rather than two, the cutting and peeling of the skin can be performed more easily and faster than it could be done with apparatus 10 of FIG. 1.

The blades 162 are preferably evenly spaced about an outer blade 122, but can be spaced about blade 122 in any desired manner. As can be seen in FIG. 11A, the blades 162 extend along radii of the outer cutting blade 122. As shown in FIG. 11B, peeling blades 162' may also be secured to blade 122 so that they do not extend along a radius R of the outer blade 122. In this manner, the blades 162 would be mounted similarly to the blades 62 of corer/peeler 10, i.e. a line which extends along the blades 162 forms a secant with the outer cutting blade. The provision of three blades as shown in FIG. 11B eases the cutting of the peel and hence also of the coring of the fruit because they cut through a larger portion of the fruit's skin, as described above.

In other respects, the construction of the apparatus 110 is similar to apparatus 10. It has a base 112 with pattern P' formed therein. Pattern P' includes grooves which correspond to each of the blades. An inner blade 120 is a circular cutting blade which separates the fruit's core from the fruit's pulp. Blade 120 is secured to a cross-member 132 and passes through arm 148. It will be understood that blade 120 may be formed in any desired manner, such as, for example, the shapes shown in FIGS. 8A–8E.

Three pairs of posts 146 support arm 148 above base 112. The posts 148 are arranged in a generally triangular pattern. Preferably, they are arranged as an isosceles triangle. Three other posts 156 are secured to cross-member 132. Posts 156 extend downwardly from cross-member 132 and pass through arm 148 to removably receive blades 162 in their slots. Because three blades are used, the member 132 and arms 148 are preferably substantially triangular in shape, with the respective corners being truncated so that the member 132 and arm 148 do not extend beyond the base 112.

The apparatus uses three pair of posts 146 and three rods 147, rather than the two pair of posts and two rods that were used by apparatus 10. The provision of the three pair of posts and the three rods makes the apparatus 110 stronger, sturdier, and more stable than the apparatus 10. The apparatus 110 is also made stronger and sturdier by the fact that cross-member 132 and arm 148 are increased in size and weight, as compared to cross-member 32 and arm 48. The increased size and increased support allow the apparatus to stand up to greater commercial use. Although apparatus 110 is heavier than apparatus 10, the three-blade arrangement makes it easier and less fatiguing to operate.

In view of the above, it will be seen that the various objects and features of this invention are achieved and other advantageous results obtained. As various changes could be made in the above constructions without departing from the scope of the invention, it is intended that all matter contained in the above description or shown in the accompanying drawing shall be interpreted as illustrative and not in a limiting sense.

Having thus described the invention, what is claimed and desired to be secured by Letters Patent is:

1. A fruit cutting and coring apparatus comprising:

a base plate having an upper surface forming a cutting board for supporting a piece of fruit in a position in which said piece of fruit is cored and a skin of the fruit cut;

an inner cutting blade for separating a core of said fruit from a flesh of said fruit and an outer cutting blade for separating said skin from said flesh, the outer cutting blade being a circular blade to make a generally circular cut in said skin, and said inner and outer cutting blades being coaxially aligned;

at least three spaced apart skin cutting blades extending outwardly from said outer cutting blade to slice said skin;

guide means for guiding movement of said inner and outer cutting blades;

manually operable handle means for simultaneously moving said inner and outer cutting blades from a position above said cutting board toward said cutting board to cut said skin and core said piece of fruit; and a cross-member to which said handle means is secured, said inner cutting blade depending from said cross-member, a plurality of rods depending from said cross-member, there being a rod for each skin cutting blade with one of said skin cutting blades being respectively removably secured to one of said rods for supporting said skin cutting skin, said rods each having a vertically extending slot in the base thereof in which one of said skin cutting blades is received, each skin cutting blade and its associated rod having aligned through-bores for receiving a fastener by which said skin cutting blades are removably secured to said apparatus.

2. The apparatus of claim 1 wherein said inner cutting blade is attachable to said cross-member.

3. The apparatus of claim 1 wherein the guide means includes a guide arm supported above the cutting board with openings therein for guiding movement of said inner cutting blade, said rods extending through said openings in said guide arm.

4. The apparatus of claim 3 including a guide block positioned beneath said guide arm for further guiding movement of said inner blade.

5. The apparatus of claim 3 further including opposed ports extending upwardly from said cutting board for supporting said guide arm.

6. The apparatus of claim 1 wherein said skin cutting blades extend radially from said outer cutting blade.

7. The apparatus of claim 6 wherein said skin cutting blades are spaced around said outer cutting blade.

8. The apparatus of claim 1 wherein said skin cutting blades extend away from said outer cutting blade, such that a line extending along an elongate axis of said skin cutting blade defines a secant through said outer cutting blade.

9. The apparatus of claim 1 wherein the handle means further includes spring means urging the inner and outer cutting blades to a first position.

10. The apparatus of claim 1 further including suction means for mounting the base plate to the top of a table.

11. The apparatus of claim 10 wherein the suction means comprises at least one pair of suction cups attached to one end of the base plate.

\* \* \* \* \*